United States Patent [19]
Daoud et al.

[11] Patent Number: 6,024,600
[45] Date of Patent: Feb. 15, 2000

[54] MOUNTING FASTENER FOR GROUNDING DAISY CHAIN CONNECTED BUILDING ENTRANCE PROTECTORS

[75] Inventors: Bassel Hage Daoud, Parsippany, N.J.; Ronald Marchisin, Toby Hanna, Pa.; Walter Pelosi, Randolph, N.J.; Anthony Robert Trancreto, Brooklyn, N.Y.

[73] Assignee: Lucent Technologies Inc., Murray Hill, N.J.

[21] Appl. No.: 09/036,952

[22] Filed: Mar. 9, 1998

[51] Int. Cl.[7] .............................. H01R 13/60; F16B 35/00
[52] U.S. Cl. ..................... 439/540.1; 439/939; 174/51; 361/816; 411/389; 411/107
[58] Field of Search ...................... 411/389, 388, 411/401, 107, 919; 439/92, 97, 939, 540.1, 715, 717; 174/51, 35 R; 361/816, 818

[56] References Cited

U.S. PATENT DOCUMENTS

| | | |
|---|---|---|
| 354,123 | 12/1886 | Flynn . |
| 4,263,472 | 4/1981 | Maheu . |
| 4,690,365 | 9/1987 | Miller ........................................ 411/389 |
| 5,148,720 | 9/1992 | Swenson .................................. 411/389 |
| 5,280,132 | 1/1994 | Clarey . |
| 5,312,005 | 5/1994 | Odell ....................................... 411/389 |
| 5,333,978 | 8/1994 | Rives ....................................... 411/389 |
| 5,740,004 | 4/1998 | Daoud . |
| 5,796,039 | 8/1998 | Daoud . |

FOREIGN PATENT DOCUMENTS

| | | | |
|---|---|---|---|
| 29526 | 3/1919 | Norway | ................................ 411/389 |

*Primary Examiner*—Flemming Saether

[57] ABSTRACT

A fastener for simultaneously mounting adjacently disposed building entrance protectors (BEP) units to a mounting panel and for grounding the units to each other. The fastener includes a tapered and preferably threaded shaft for facilitating securement of the fastener into the mounting panel, such as by screwing or the like. A lip is integrally formed on the shaft and a clamping element, such as a nut, is movably engaged with an untapered opposite end of the shaft so that when rotated about the shaft opposite end, the nut is translated into close proximity with the lip. When mounting tabs from adjacent BEP units are placed between the nut and lip, and the nut is then rotatably tightened, the mounting tabs are placed in electrical contact to provide a grounding connection between the BEPs while securing the adjacent BEPs to the mounting panel.

10 Claims, 4 Drawing Sheets

MOUNTING FASTENER FOR GROUNDING DAISY CHAIN CONNECTED BUILDING ENTRANCE PROTECTORS

BACKGROUND OF THE INVENTION

I. Field of the Invention

The present invention concerns devices for protecting telecommunications equipment from voltage spikes, current overload or sneak current. More particularly, the present invention relates to a device for connecting building entrance protectors to each other. Most particularly, the present invention is directed to a fastener construction for connecting and maintaining daisy-chain connections between adjacent building entrance protectors to protect terminal equipment from voltage spikes.

II. Description of the Related Art

Building entrance protectors (BEP) are commonly used as an interface between communication lines from a central office and communication lines in an indoor environment, as for example in office buildings, apartment buildings, etc. The communication lines from a central office and, in the case of a business office, local inter-office lines that connect to terminal devices in an office environment, are connected to BEP units. BEP units have mounting tabs and are typically mounted in a wiring room or closet and fastened by their mounting tabs to panels such as plywood boards, etc., by fasteners placed through the mounting tabs. It is essential for terminal device equipment protection that the BEP units are grounded so that they provide a discharge path for voltage surges or spikes, current overloads or sneak current that may occur in the building from other equipment or from a lightning strike on a central office line, and which would otherwise damage terminal device equipment connected to communication lines through the BEP units.

A problem arises with BEP installation in that a first BEP is typically fastened to a panel and grounded by a wire, and then other BEP units are sequentially connected to the first BEP unit in a line or "daisy chained" together. To provide for a common ground between a plurality of BEP units, a small wire usually connects a first BEP to a second BEP, a second BEP to a third, etc., with only the initial (e.g. first) BEP unit connected directly to the building or earth ground. Such a daisy-chain connecting technique introduces difficulties because, often times interconnecting BEP grounding wires are inadvertently or carelessly disconnected or are omitted which eliminates the safety ground from one or more of the BEPs in the chain. As a result, some of the BEPs and the terminal devices connected thereto will become or remain ungrounded and thus susceptible to damaging voltage spikes, current overload and sneak current.

SUMMARY OF THE INVENTION

The present invention provides a securing fastener which provides for daisy-chain mounting of BEP units to each other and to a mounting surface to ensure electrical grounding interconnection between successive or adjacent BEPs. The inventive fastener includes a shaft portion dimensioned for insertion onto fastening tabs that are integral with the BEPs. The shaft portion contains an integrally formed lip or washer and a screw section which is configured for engaging a mounting panel for securing the fastener to the panel. A clamp element is positioned on the shaft portion and is movably engageable with and in a direction toward the lip. In use, the fastener is secured to a mounting board and tabs from adjacent ends of adjacent BEPs are placed over the fastener and positioned between the lip and the clamp element. The tabs are preferably configured with a key-hole shape for this purpose. When so positioned, the clamp element is tightened to secure and maintain the adjacent tabs in contact with each other. In a preferred embodiment, the fastener has a notched end for facilitating the use of a screwdriver to secure the fastener to a substrate or mounting board, and a nut fixed to the lip for accommodating use of a wrench to secure the fastener in place.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawing when like reference characters denote similar elements throughout the several views.

DETAILED DESCRIPTION OF THE PRESENTLY PREFERRED EMBODIMENTS

Figure 1:
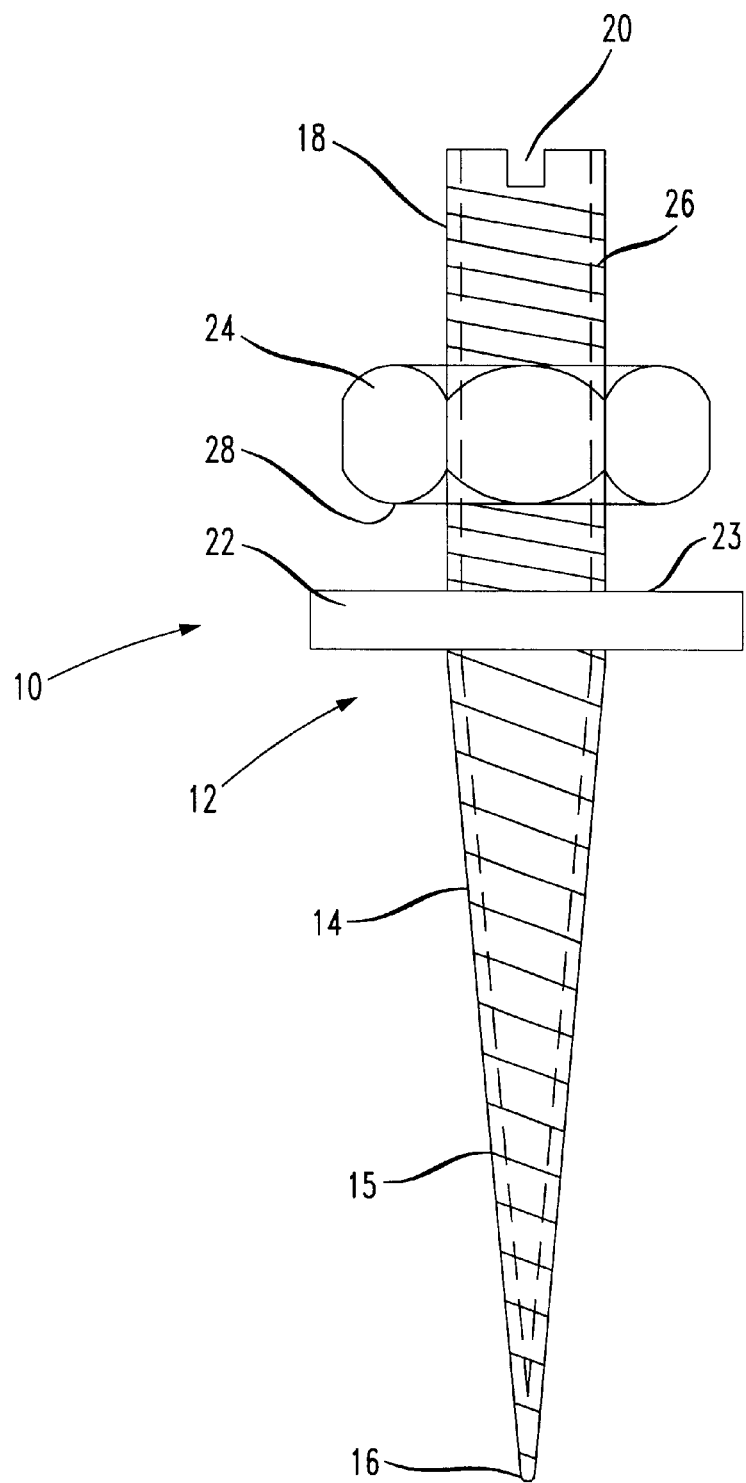
FIG. 1 is a side view of a fastener constructed in accordance with the present invention.
Figure 2:
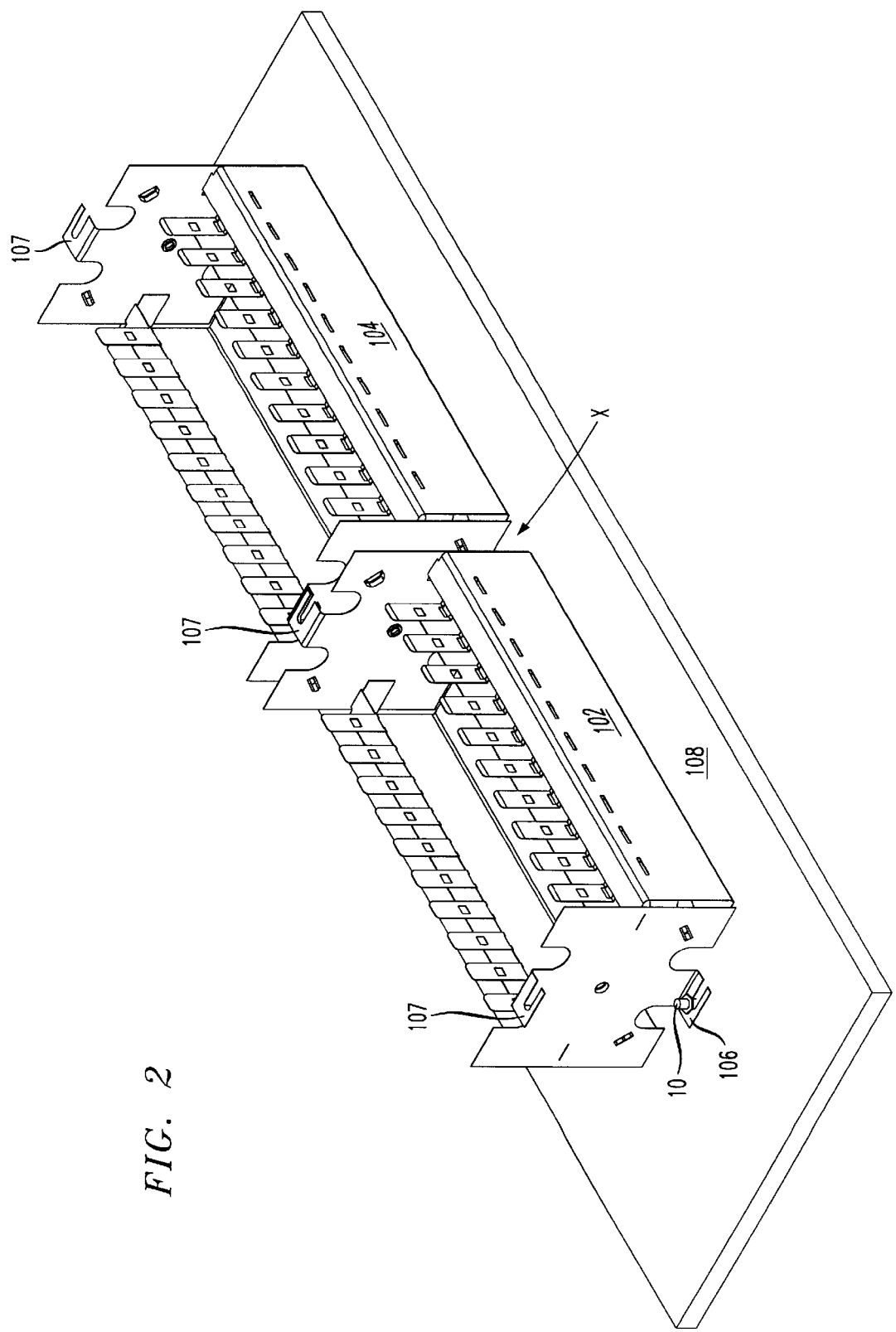
FIG. 2 is an elongated perspective view of a daisy-chain connected pair of BEP units fastened together in accordance with the invention.

With reference now to the drawings, an inventive BEP fastener 10 in accordance with a preferred embodiment of the present invention is depicted in FIG. 1. As there shown, the fastener 10 includes a shaft 12 having a tapered portion 14 with threading 15 and a pointed end 16. The threading and pointed end facilitate mounting of the fastener to and into a surface, such as by screwing or rotation of the fastener. As also shown, fastener 10 has an engaging end 18 in which a notch or groove 20 is defined for facilitating mounting of the fastener, as by accommodating use of a torque applying tool such as a screwdriver. A radially-outwardly extending, and preferably a circumferentially continuous and/or annular stop element 22 such as a lip or washer or nut having an upper surface 23 is preferably integrally formed with the shaft 18 and positioned at the beginning or top of the tapered portion 14 as depicted in FIG. 1. Lip 22 serves, inter alia, as a stop for preventing an excess length of shaft 18 from entering mounting panel 108 (FIG. 2). A clamp element 24 such as a nut is positioned radially about shaft 12 proximate the engaged end 18. In a preferred form, nut 24 is threaded and engages threading 26, as is known in the art, so that when torque is applied to nut 24 in one direction it is translated along the end of shaft 12 into close proximity to stop element or lip 22 and more specifically, the bottom or lower surface 28 of nut 24 is advanced into close proximity to upper surface 23 of lip 22. As will hereinafter become apparent, nut 24 will operatively clamp an element to lip 22 when appropriate torque is applied to the nut.

The intended use of inventive fastener 10 for daisy-chain mounting of adjacent BEP units is shown in FIG. 2. As there seen, a first BEP 102 and a second BEP 104 are daisy-chain mounted to a common mounting panel or substrate or board 108. Each BEP unit has lower slot or key-hole shaped mounting tabs 106 (i.e. one tab positioned at each end), and may also include similar-shaped upper tabs 107 for vertical stacking of additional BEP units as is known in the art. To thus secure the BEPs 102, 104 to the board 108, a fastener 10 is secured to board 108 in a known manner, e.g. by screwing or hammering, in the predetermined location on board 108 at which it is desired to mount a BEP unit so that the lip 22 sits snugly against the surface of board 108. Once the fastener 10 is in place, the confrontingly opposed mounting tabs 106 of BEP units to be adjacently located on the mounting board are positioned between lip and nut 24 such as by sliding the tabs around the upstanding post 12 (for a slot type mounting tab) or by lowering tab 106 over the post or shaft 12 of fastener 10 (for a key-hole tab). Once thusly in place, nut 24 is rotatably tightened to clamp the adjacent tabs together between surface 28 of the nut and surface 23 of the lip.

Figure 3:
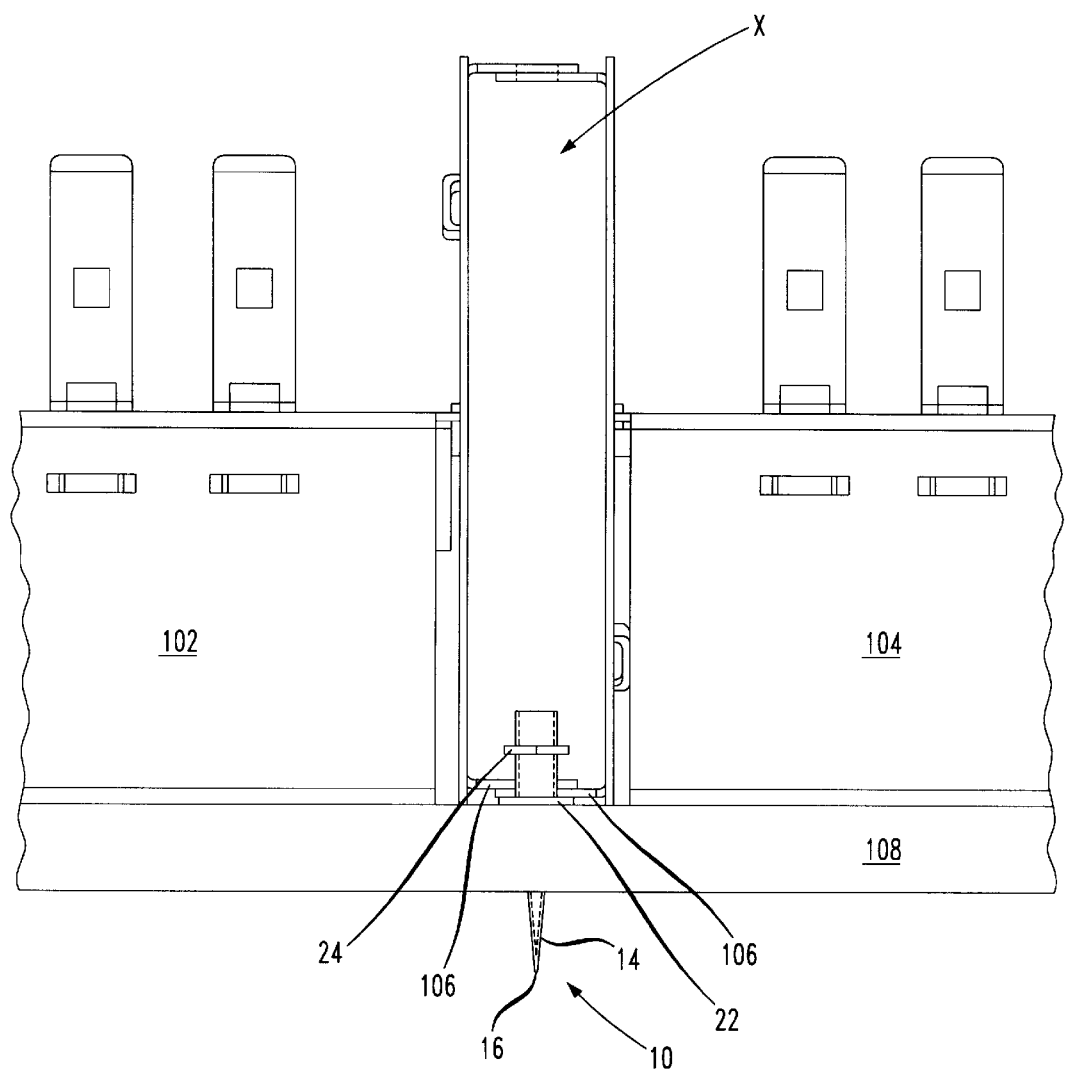
FIG. 3 is a partial side view of the BEP pair of FIG. 2.

Region X of FIG. 2 is shown in further detail in FIG. 3, in which adjacent tabs 106 from adjacent BEP unit 102, 104 are seen connected together by a common fastener 10 that also secures the tabs to the mounting panel 108. As will be appreciated, the engagement of the fastener 10 to mounting panel 108 may loosen over time as a result of the properties of the material from which the panel 108 is constructed, e.g. wood. However, inasmuch as the lip and nut combination are formed of a stronger material, such as steel, than the mounting panel, should the fastener loosen over time, the overlaying and commonly secured tabs 106 will nevertheless remain in contact with each other by virtue of the clamping force applied between nut 24 and lip 22. Thus, the required grounding of adjacent tabs and BEP units is maintained. In this manner, BEP units can be readily daisy-chain connected without having to separately connect individual or discrete grounding wires between them. Only a single grounding wire connecting one of the BEPs to ground is required to assure grounding of all of the BEPs in the chain.

Figure 4:
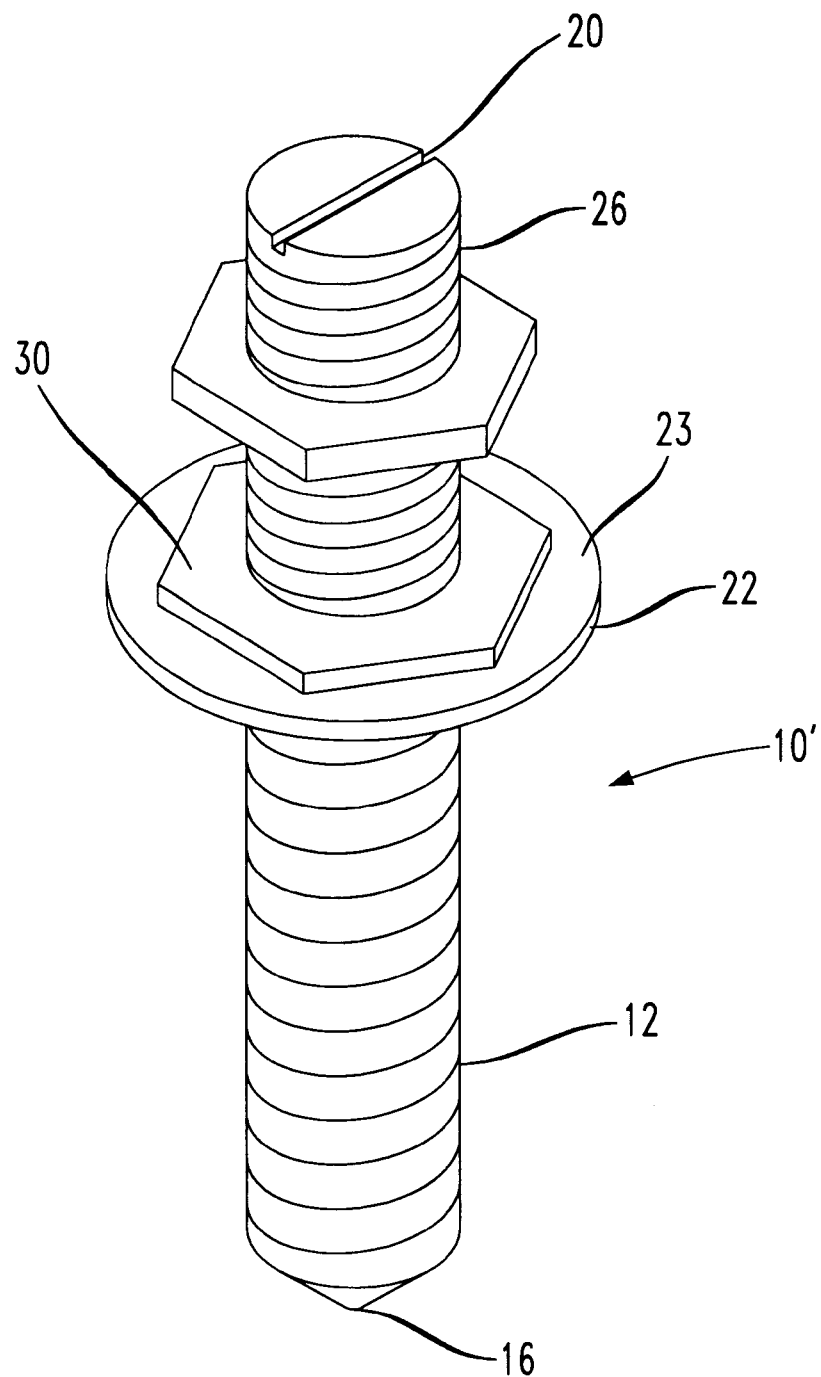
FIG. 4 is an elevational perspective view of another embodiment of the present invention.

An alternative embodiment of the inventive fastener is depicted in FIG. 4. As there shown, the modified fastener 10' includes a mounting device 30 in lieu of or in addition to the groove 20. A mounting device 30, such as a nut, is permanently affixed to or molded or fabricated onto or with lip 22 to allow the lip 22 to be grasped for applying a rotational torque to the fastener 10', thus facilitating mounting of the fastener 10' into mounting panel 108. Fastener 10' can accordingly be inserted into and affixed to panel 108 by using a wrench that grasps the mounting device 30 to apply torque to device 30, or by using a screwdriver which applies torque to the fastener 10' via groove 20. Also as shown in the alternative embodiment of FIG. 4, the fastener 10' need not have tapered walls but may simply have a pointed end 16 to facilitate mounting into panel 108.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A combination of a first building entrance protector (BEP) and a fastener for use in simultaneously mounting, to a mounting panel, said first BEP to a second BEP which is connected to electrical ground, said combination comprising:

a mounting tab formed on said first BEP for accommodating insertion of said fastener, said mounting tab being alignable with a mounting tab of the second BEP;

said fastener comprising an elongated shaft having a threaded first end and a tapered second end for facilitating fastener entry into and securement to the mounting panel;

a stop element outwardly extending from said shaft between said first and second ends and having an engagement surface; and a clamp element having an engagement surface and positioned on said shaft proximate said first end and in relatively moveable engagement with said first end threading for translating said clamp element along said first end toward and into close proximity with said stop element so that when said mounting tab of said first BEP is aligned with the mounting tab of the second BEP and both the first BEP mounting tab and the second BEP mounting tab are positioned between said stop element and said clamp element and the clamp element is displaced along the shaft first end toward said stop element to dispose the engagement surfaces of the clamp element and the stop element into opposed disposition, the first BEP mounting tab and the second BEP mounting tab are grasped between the opposed engagement surfaces of the clamp element and stop element to provide and maintain electrical contact between said first BEP and said second BEP while at the same time being capable of securing said first BEP to the mounting panel.

2. The combination of claim 1, wherein said fastener stop element comprises a lip integrally formed with said shaft.

3. The fastener of claim 2, wherein said fastener clamp element comprises a threaded nut for threaded engagement with said shaft.

4. The fastener of claim 3, wherein said fastener first end has a groove formed therein for receiving a screwdriver blade.

5. The fastener of claim 4, further comprising a second nut fixedly secured to said lip.

6. The combination of claim 1, wherein said fastener clamp element comprises a threaded nut for threaded engagement with said shaft.

7. The fastener of claim 1, wherein said fastener first end has a groove formed therein for receiving a screwdriver blade.

8. The fastener of claim 1, further comprising a nut fixedly secured to said stop element.

9. The fastener of claim 1, wherein said second end is threaded.

10. A method of simultaneously mounting a first building entrance protector (BEP) having a mounting tab to a mounting panel and grounding the BEP through an adjacent second BEP that is connected to an electrical ground and that has a second mounting tab, comprising the steps of:

inserting a fastener having an elongated shaft, a threaded first end and a tapered second end into a mounting panel so that said second end engages the mounting panel, said fastener having a stop element extending outward from said shaft between said first and second ends and having an engagement surface;

overlaying the mounting tab of the first BEP over the second mounting tab of the second BEP;

placing the overlaid mounting tabs on the threaded first end so that one of the overlaid mounting tabs rests against the engagement surface of said stop element; and clamping the overlaid mounting tabs to the stop element by utilizing a clamp element having an engagement surface and positioned on said shaft proximate said first end and in relatively moveable engagement with said first end threading for translating said clamp element along said first end toward and into close proximity with said stop element so that when the overlaid tabs are positioned between said stop element and said clamp element and the clamp element is displaced along the shaft first end toward said stop element to dispose the engagement surfaces of the clamp element and stop element into opposed disposition, the mounting tabs are grasped between the opposed engagement surfaces of the clamp element and stop element to provide and maintain electrical contact between the mounting tabs of the first and second BEPs and to mount the first and second BEPs to the mounting panel.

* * * * *